T. A. HOWARD.
FISH SCREEN.
APPLICATION FILED SEPT. 12, 1910.
992,563. Patented May 16, 1911.
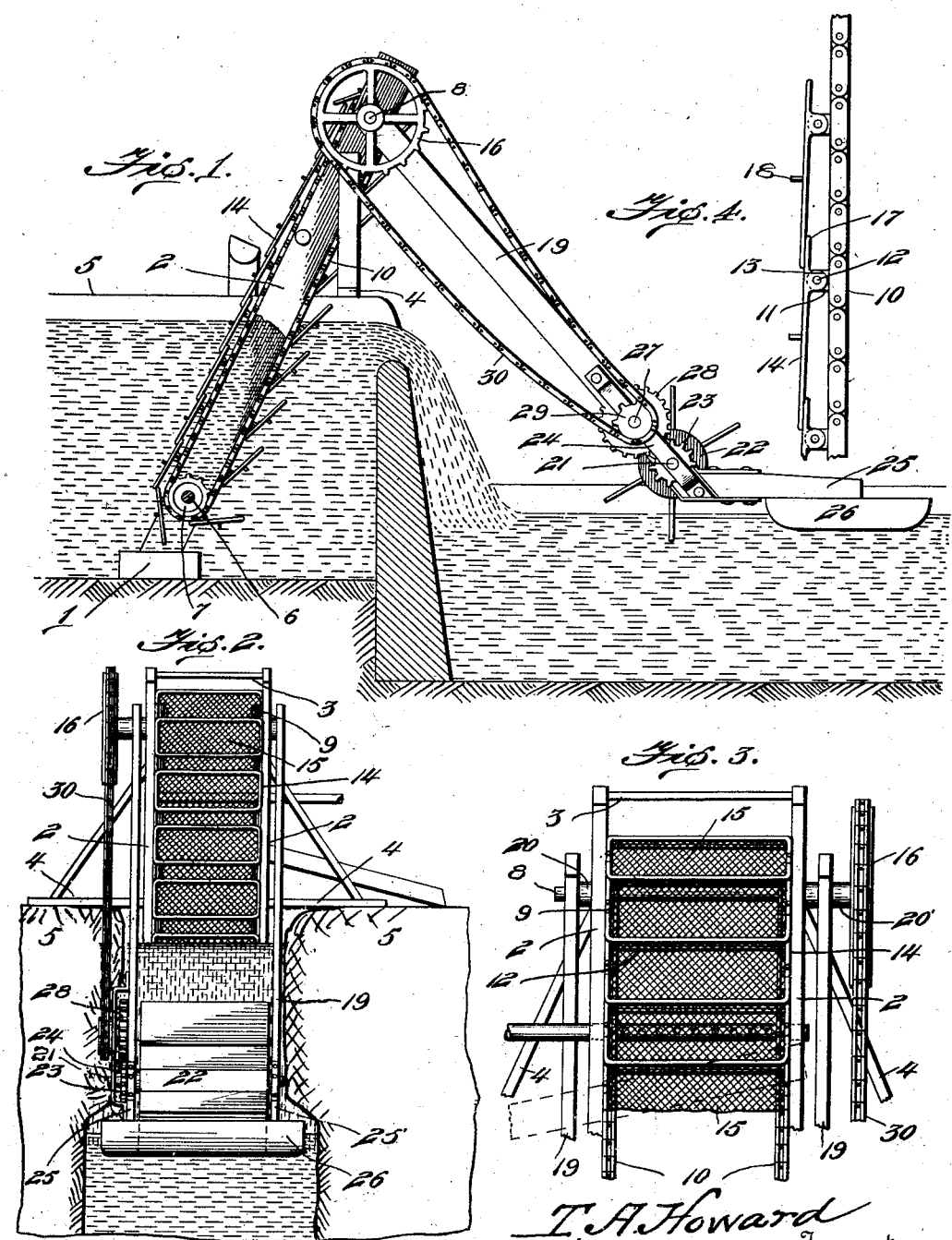

UNITED STATES PATENT OFFICE.

THOMAS A. HOWARD, OF MURRAY, UTAH.

FISH-SCREEN.

992,563.

Specification of Letters Patent.   Patented May 16, 1911.

Application filed September 12, 1910.   Serial No. 581,741.

*To all whom it may concern:*

Be it known that I, THOMAS A. HOWARD, a citizen of the United States, residing at Murray, in the county of Salt Lake and State of Utah, have invented certain new and useful Improvements in Fish-Screens, of which the following is a specification.

My invention relates to improvements in fish screens, and has particular reference to screens adapted to be placed in a stream, canal or other waterway which will prevent the passage of fish therethrough while assisting in the removing of the debris in the stream and preventing the collection thereof.

The object of my invention is the provision of a screen of this character especially adapted for use at dams or gates which will prevent the fish in the stream from passing therethrough and which will prevent the collecting of debris against either the screen or the foot of the dam or gate but will cause said debris to pass over the obstruction and pass on down the stream.
To attain the desired object, my invention comprises a sectional revolving fish screen extending from the bottom of the waterway to a point above the high water mark thereof, and means for revolving said screen, the invention further residing in the novel features of construction and combination and arrangement of parts for service substantially as hereinafter described and as illustrated in the accompanying drawings.
Figure 1 represents a side elevation of my complete screen and mechanism for operating the same shown in position for use. Fig. 2 represents an elevation of the mechanism looking upstream. Fig. 3 represents an enlarged detailed view of the screen portion of the invention, and, Fig. 4 represents a similar view of the supporting chain especially illustrating the method of securing the screen sections thereto.
In the drawings, the numeral 1 designates the bottom or anchor beam of the supporting frame, said beam being located at the bottom of the waterway and having the side members 2 rising therefrom and connected at their upper ends by the cross-bar 3, lateral braces 4 extending from the members 2 to the bank 5 of the waterway to secure said frame in position. Journaled in the base of the members 2 is the shaft 6 bearing the sprockets 7, while journaled in the upper end of said members is a shaft 8 bearing sprockets 9, a chain 10 passing around the sprockets 7 and 9 at each side of the frame and the chains being formed with ears 11 projecting therefrom on the outer side at stated intervals, bars 12 being secured to said ears and connecting the pair of chains and holding them in spaced relation.

Pivotally mounted upon the bars 12 are the ears 13 of the frames 14 which thus depend from the bars, the said ears being preferably located near but not at the edge of the frame which projects on both sides thereof, as best shown in Fig. 4, from which it will be seen that said frames are of such size as to slightly overlap when the chain is in vertical or inclined position. The frames 14 are each covered by the suitable screening material 15 and together form a single screen member when in position to be contacted with by the current of the stream, as shown in Figs. 1 and 3.

Mounted on one end of the shaft 8 is a large gear wheel 16 for revolving said shaft through the medium of suitable driving connections, and as said shaft is revolved the sprocket chains and screened sections carried thereby pass over the top of the main frame and down the reverse or downstream side thereof. It will be observed that the rear edges 17 of the frames 14 contact with the chains and cause the frames to project upward at an acute angle on their downward movement, serving to shake or drop any debris resting on their surface onto the water which has passed through the screen and be carried away thereby. If desired, I may provide the frames 14 with fingers 18 to aid in elevating the said debris.

Pivotally supported by the shaft 8 are the supplemental frame members 19 held in spaced relation on the shaft 8 by the collars 20, said members extending downward and having the shaft 21 journaled in their lower ends, said shaft bearing a water or paddle wheel 22 and a gear wheel 23 and having its outer gear-bearing end supported by the bracket 24 carried by one of the members 19. Secured to the lower ends of the supplemental frame members 19 are the bars 25 having their other ends secured to a float 26, said float serving to support the said lower ends and water wheel 22 at the correct height above the water to insure the most efficient operation thereof, the float resting upon the water and rising and falling therewith and the wheel being at all times at the same relative position to the water without reference to the depth thereof, the frame 19 swinging on the shaft 8 as a pivot.

Journaled in the member 19 and the bracket 24 is a stud shaft 27 bearing on one end a pinion 28 in mesh with the gear 23 and on the other end a sprocket 29 connected by a chain 30 with the sprocket or gear 16 for driving the shaft and revolving the screen upon the revolution of the water wheel.

From the foregoing description taken in connection with the drawings the construction and operation of my improved fish screen will be readily understood and its advantages fully apparent, and it will be seen that I have provided an improved fish screen in which the screen sections on their upward travel form a tight overlapping joint with each other to provide a screen through which the fish cannot pass, while said screen extends so close to the bottom of the stream as to prevent the fish from passing thereunder, this being further prevented by the sections of the screen hanging to practically scrape the bottom as they pass around the lower sprocket wheels, while the position in which said sections hang on their downward movement causes all debris carried upward thereby to drop into the water or be washed therefrom by the current of the water as they come down into contact therewith. It will be further observed that I have provided improved means for driving or rotating said sectional screen and for maintaining the said driving means automatically at the same relative position with respect both to the shaft 8 and the surface of the water irrespective of height of the water or whether it is at its highest or lowest mark.

It will be further understood that while I have illustrated my improved sectional revolving screen as located at a dam or gate with the screen thereabove and the driving mechanism therebelow that the entire mechanism may be located at some other point in the waterway than said obstruction, and that instead of my specific form of driving means I may employ an overshot wheel located under the fall or any other suitable means for rotating the shaft 8.

I claim:

1. A sectional revolving fish screen, comprising a frame rising from the bottom of the waterway, a pair of shafts journaled near the opposite ends of the frame and bearing sprocket wheels, chains connecting the sprockets, bars for retaining the chains in spaced relation, and overlapping screen sections pivotally secured to said bars.

2. A sectional revolving fish screen, comprising a frame rising from the bottom of the waterway, a pair of shafts journaled near the opposite ends of the frame and bearing sprocket wheels, chains connecting the sprockets, bars for retaining the chains in spaced relation, overlapping screen sections pivotally secured to said bars, a large sprocket carried by one of the shafts, a water wheel, and a chain connecting the sprocket with the wheel for revolving the said shaft and thus the sectional screen.

3. A fish screen, comprising a main frame rising from the bottom of the waterway, a revolving sectional screen carried thereby, a shaft in the frame around which said screen passes, a supplemental frame depending from said shaft and pivotally supported thereby, a float carried by the lower end of said supplemental frame, a water wheel supported by the supplemental frame adjacent the float and having its shaft journaled in said supplemental frame, and connections between the said shaft and the shaft carried by the main frame for revolving the latter to operate the screen.

In testimony whereof I affix my signature, in presence of two witnesses.

THOMAS A. HOWARD.

Witnesses:
B. H. STOUT,
JESSE C. CASPER.